July 24, 1962  E. RAHLSON  3,045,324
METHOD OF MAKING A MACHINE FRAME ELEMENT
Filed March 14, 1960
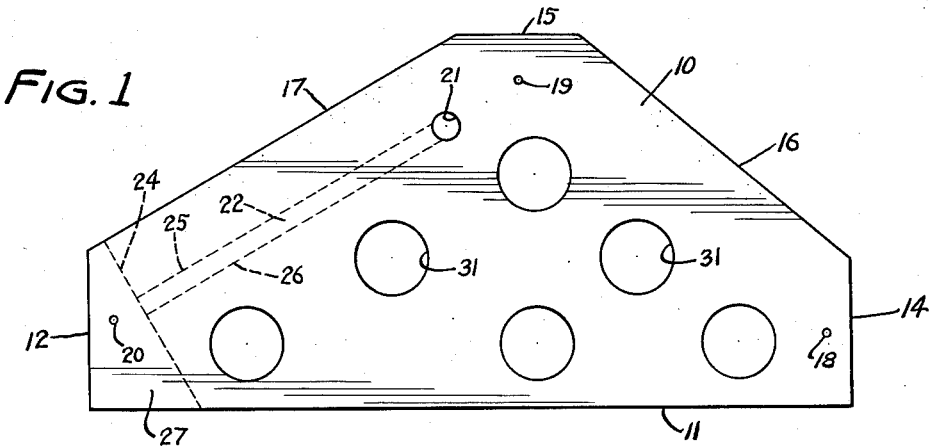
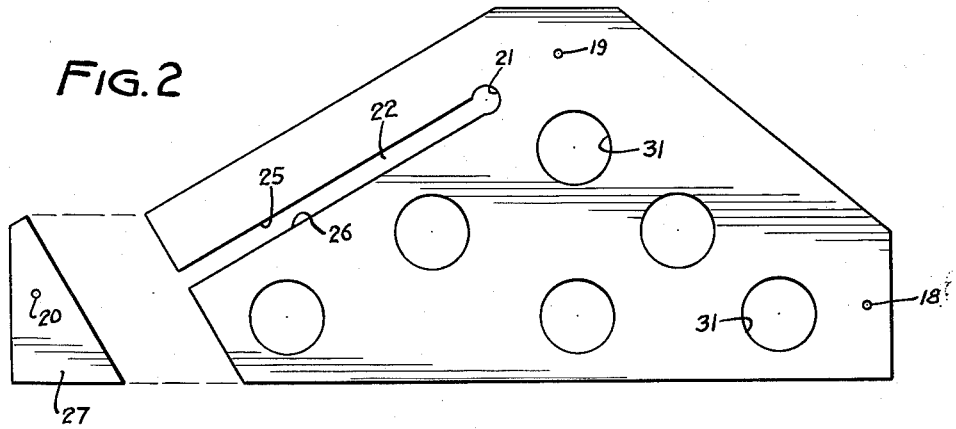
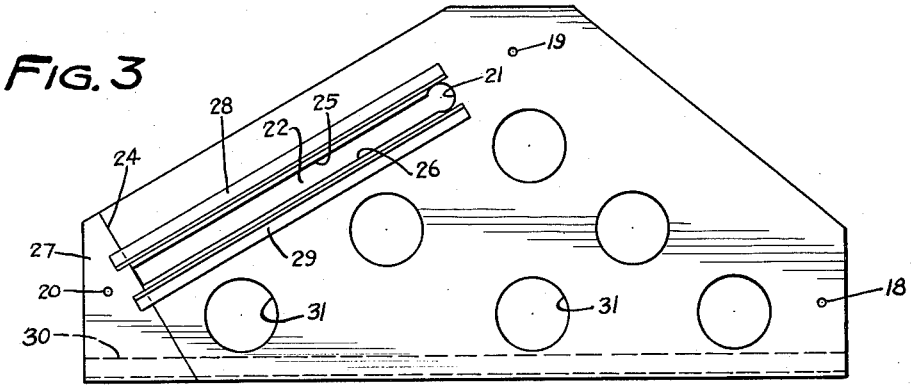
INVENTOR.
ERICH RAHLSON
BY
Moore, White & Burd
ATTORNEYS

United States Patent Office 3,045,324
Patented July 24, 1962

3,045,324
METHOD OF MAKING A MACHINE
FRAME ELEMENT
Erich Rahlson, 803 Keosauqua Way,
Des Moines 14, Iowa
Filed Mar. 14, 1960, Ser. No. 14,941
8 Claims. (Cl. 29—150)

This invention is a method for making machine frames for relatively large machines that are manufactured in small quantities, and for the frame element resulting from the use of that method. Specifically, the method comprises the making of machine frame elements in pairs so that they are identical to each other as to bearing location and the severing of one portion from each frame element as to permit making elongated slots therein by means of a power shear.

Heretofore, the frames for large machines manufactured in small quantities have been constructed from channel or angle members welded together in jigs which are supposed to maintain tolerances from one element to the next. During the development the present machine, and particularly in case of one certain machine, it was discovered that when widely spaced and allegedly parallel mounted bearings for sprocket carrying chains were positioned on frames assembled by the jig method, a substantial variation resulted from one frame structure to the next even though great care was used. When parallel chain drives are run over sprockets not precisely positioned opposite to each other on opposing frame sides, difficulties are encountered in keeping the chains riding on the sprockets. In fact, so much difficulty was encountered in this respect that the machine itself, for which the present frame was made, was for a time thought unsatisfactory. As a result of the inexact location of bearings in the older type frames, substantial vibration was observed whenever the machines were operated. With the development of the technique described and claimed herein however, machines are manufactured in which the chain carrying sprockets are so precisely located with respect to each other from side to side on the machine that the machine can be operated at substantial speed without noticeable vibration. At the same time the numbers of these machines required for the industry using them is small enough that it is not practical to manufacture dies that would stamp out identical parts.

Accordingly, it is the principle object of this invention to provide a novel method of making large machine frames in small quantities.

It is a further object of this invention to provide a novel machine frame manufacturing method that makes possible the economical manufacture of precisely duplicated frame elements in small quantities.

It is a further object of this invention to provide a machine frame manufacturing method which does not require dies for the formation of identical units.

It is a still further object of this invention to provide a method of making machine frames having elongated slots therein that are true and parallel to each other by reason of the novel method of cutting these slots.

It is yet another object of this invention to provide a method of making a machine frame by severing a portion of the machine frame side therefrom to permit cutting an elongated slot therein by means of a power shear.

Still another object of this invention is to provide machine frame elements made in pairs; whereby the bearing locations are precisely the same in the pair.

It is a still further object of this invention to provide a machine frame element having identical slots formed therein by severing portions of one end of each to permit cutting the slots with power shears; the inside end of the slot is relieved by a hole having a diameter larger than the slot.

Still other objects are inherent in the specific structures shown and described herein.

To the accomplishment of the foregoing and related ends, this invention then comprises the features hereinafter fuly described and particularly pointed out in the claims, the following description setting forth in detail certain illustrative embodiments of the invention, these being indicative, however, of but a few of the various ways in which the principles of the invention may be employed.

The invention is illustrated by the accompanying drawings in which the same numerals refer to corresponding parts and in which:

FIGURE 1 is a side elevation view of the machine element frame prior to having the end severed in order to cut the slot; broken lines illustrate the shearing that is made in order to cut the slot in the side;

FIGURE 2 is an exploded view of side elevation as a machine frame element showing the end severed and the slot cut; and FIGURE 3 is a side elevation view of the reassembled machine frame element with the slot cut therein; broken lines illustrate hidden parts; all figures are drawn to the same scale.

In the drawings the frame element is illustratedly shown as a frame side for a corn husking bed.

This frame side element is generally designated 10 and is formed from a heavy gage of sheet steel. It is sheared to conform to some shape suitable for the specific machine to which it is adapted. In this case it is a six-sided figure having the base 11, the ends 12 and 14 with the top 15 joined to the ends by the elongated slanting top portions 16 and 17.

The raw sheets thus formed are grouped in even numbered piles, and are tightly stacked with great care taken that all bases 11 and all their respective ends 12 or 14 are precisely aligned with each other. So positioned in respect to each other, the sheets are held so securely. They are now drilled for shaft receiving openings of which holes 18, 19 and 20 are typical examples. In the case of each sheet therefore, all holes such as the ones 18, 19 and 20 are precisely positioned with relation to the base 11 and one end of the frame elements. These holes 18, 19 and 20, furthermore, are precisely the same distance from each other and positioned relative to each other identically on each sheet of a group drilled together. A certain hole designated 21 is also made at this time which is a reference point determining one end of a slot to be cut later.

After having conformed the raw sheets to each other to this extent, the sheets are marked with serial numbers, adjacent sheets being given numbers to identify them as a pair. Furthermore the sheets are individually identified in some manner also. For example, the two top sheets might be marked 1A and 1B. The next two sheets could be designated 2A and 2B so on through the pile. Since the sheets are drilled in even numbered groups, there will always be matching pairs sequentially numbered. At the same time that the sheets generally are marked with sequential serial numbers, the end portions 27, which result from severing the sheet on line 24, are marked identically with the main portion of the sheet from which they are cut. The purpose in so marking these end portions will become apparent from the discussion below.

A problem of still greater difficulty was encountered in making these machine frame elements when an elongated slot such as that designated 22 in FIG. 3 and indicated in broken lines in FIG. 1 was required in the frame side elements.

In the first attempts to make the sheet metal frame sides, the slot was attempted to be cut by means of cutting torches or devices, known as nibblers, that punch a series of small openings to make a blind cut. In both of those instances the results were unsatisfactory. Nibblers could not be guided accurately enough to cut a sharply defined straight slot. The cutting torch could be guided, of course; but it was discovered that no matter how carefully the heat was applied to the sheet for cutting, warping or distortion occurred, if not always, at least often enough to make the process unsatisfactory. Likewise, the slot is so long and there is so much shearing required that a die capable of making this cut is prohibitively expensive to make for small production. Such a die would also require a large press having a substantial bed. Again, a die of correct width and progressively cutting this slot, with the sheet fed into the die, or the die being advanced into the sheet, suffers from the same lack of accurate "guiding" as already pointed out above for the nibbler. Hence, some other reliable technique had to be developed to make a clean precise cut. This was accomplished by severing the end of machine 10 at the broken line designated 24 in FIG. 1. By so doing the end of slot 22 was made accessible to one end of standard power shear blade. Since hole 21 is of a diameter larger than the width of slot 22, the other end of the shear blade could operate through the hole 21 without distorting the surrounding portions of plate 10. As edge 17 is parallel to the slot 22, it is used as a reference point against the back gauge of the shear when shearing the sides 25 and 26 of the slot.

As each pair of end pieces 27 and the main frame element 10 from which they have been severed are identically marked, these exact elements may be reassembled at the time that the frame is welded together again. Thus pairs of identical side frame elements sequentially numbered are provided. Even though there is some variation between groups of plates or possibly even between pairs of plates in the same group, therefore, there is substantially no variation between the members making up a pair of plates. Experience has shown that machine frame elements made in this manner provide machines which operate with extreme smoothness and relatively very little noise.

Reassembly of end 27 to the main frame element is accomplished by first realigning identically marked end pieces and side pieces as precisely as possible. With the edges 17 and base 11 aligned as near as may be, tack welding is used to temporarily secure the pieces together. A pair of angle members designed 28 and 29 are then secured to the main portion of side element 10 on either side of slot 22 as shown in FIG. 3, and these angle members are long enough to extend beyond the cut 24. Angles 28 and 29, therefore, aid in precisely aligning portion 27 to the main frame 10. Another large angle member is welded or otherwise secured to the inside bottom of the frame elements and extends entirely from one end to the other of plate 10. This element is indicated by broken lines in FIG. 3 at 30.

After these angle members have been securely welded to both the main side elements and an end portion 27, the balance of seam 24 can be left as is, or several short intermittent welds can be applied. For appearance sake these are again ground flush with the plate surface. As the end piece 27 is braced and reinforced by angles 28, 29 and 30, this welding does not produce distortion. Hence the side is reassembled in an undistorted manner and yet provided with a cleanly sheared, undistorted slot 22.

Each machine side frame is also provided with a series of large holes designated 31 which serve the dual purpose of lightening the side frame element somewhat but principally to provide openings through which the mechanism mounted between a pair of side frame elements may be serviced. These openings do not have to be located precisely and hence they may be cut individually as by a punch press or the like.

It is apparent that many modifications and variations of this invention as hereinbefore set forth may be made without departing from the spirit and scope thereof. The specific embodiments described are given by way of example only and the invention is limited only by the terms of the appended claims.

I claim:
1. A method of making machine frame elements comprising providing at least a pair of sheet steel stock having substantially identical exterior configurations, clamping even numbers of said sheets together, locating and drilling bearing openings and said steel pieces while they are clamped together, laying out a slot location on each group of plates, cutting a hole in said sheets adjacent one end of the laid out slot; said hole being larger in diameter than the width of laid out slot, severing one end of each of said sheets adjacent to the other end of said layed out slot, shearing said laid out slot by passing a shear blade end through said hole at a point where it is larger than the width of said laid out slot, reassembling said severed ends to said sheets the same position they were before being severed.

2. The method of claim 1 in which reassembling said identically marked sheets and end portions comprises tack welding said identically marked end portions and the sheets together, welding angle iron braces to said sheet and said end portions to secure them fixedly in relation to each other, finish welding the severed joint previously existing between the severed end and said sheets.

3. The method of claim 1 and including marking said sheets in pairs with designations in part identical and in part distinct, marking the end portions severed and before severing with the same markings as the sheet of which they form a part, reassembling identically marked severed end portions and sheets.

4. The method of claim 3 in which reassembling said identically marked sheets and end portions comprises tack welding said identically marked end portions and the sheets together, welding angle iron braces to said sheet and said end portions to secure them fixedly in relation to each other, finish welding the severed joint previously existing between the severed end and said sheets.

5. A method of internally slotting large sheet metal sections comprising, forming an edge of such sheet member parallel to the desired slot, laying out the slot parallel to said edge, relieving one end of said slot with an opening larger in diameter than the width of said slot, severing a portion of said sheet adjacent the other end of said laid out slot, placing said formed edge against the stop of a power shear, power shearing said laid out slot by passing one end of the shear blade through said opening and having the other end of said shear blade extending beyond the severed end of said sheet, reassembling the severed end of said sheet to the balance of said sheet in its former location.

6. The method of claim 5 in which reassembling said identically marked sheets and end portions comprises tack welding said identically marked end portions and the sheets together, welding angle iron braces to said sheet and said end portions to secure them fixedly in relation to each other, finish welding the severed joint previously existing between the severed end and said sheets.

7. The method of claim 5 and including marking said sheets and said sheared ends identically, and reassembling said identically marked sheets and ends.

8. The method of claim 7 in which reassembling said identically marked sheets and end portions comprises tack welding said identically marked end portions and the sheets together, welding angle iron braces to said sheet and said end portions to secure them fixedly in relation to each other, finish welding the severed joint previously existing between the severed end and said sheets.

References Cited in the file of this patent

UNITED STATES PATENTS

| | | |
|---|---|---|
| 1,520,085 | Rossiter | Dec. 23, 1924 |
| 1,708,115 | Baldwin | Apr. 9, 1929 |
| 1,710,744 | Roe | Apr. 30, 1929 |
| 1,777,369 | Jacobs | Oct. 7, 1930 |
| 2,176,192 | Widman | Oct. 17, 1939 |
| 2,210,993 | Weatherhead | Aug. 13, 1940 |
| 2,376,724 | Rice | May 22, 1945 |
| 2,479,023 | Pyrebrune | Aug. 16, 1949 |